(12) United States Patent
Rakshit

(10) Patent No.: US 10,009,570 B2
(45) Date of Patent: Jun. 26, 2018

(54) THERMAL MANAGEMENT OF DISPLAY SCREENS

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/052,119

(22) Filed: Feb. 24, 2016

(65) Prior Publication Data
US 2017/0242291 A1    Aug. 24, 2017

(51) Int. Cl.
*H04N 5/64* (2006.01)
*G06F 1/16* (2006.01)
*G09G 3/36* (2006.01)

(52) U.S. Cl.
CPC ........... *H04N 5/64* (2013.01); *G06F 1/16* (2013.01); *G09G 3/36* (2013.01)

(58) Field of Classification Search
CPC ....... G09G 2320/046; G09G 2320/103; G09G 2320/0233; G09G 2320/041; G09G 2360/16
See application file for complete search history.

(56) References Cited

U.S. PATENT DOCUMENTS 4,928,182 A * 5/1990 Guerinot ............. H04N 7/0122
348/818
5,291,295 A * 3/1994 Srivastava ........... H04N 7/0122
348/555
6,037,955 A * 3/2000 DeBoer ................ G09F 13/24
346/140.1

(Continued)

FOREIGN PATENT DOCUMENTS

WO    2008142602 A2    11/2008

OTHER PUBLICATIONS

Anandan, M., "LED Backlight: Enhancement of picture quality on LCD screen", Organic Lighting Technologies LLC, Austin, Texas, USA, Proc. of ASID '06, Oct. 8-12, New Delhi, pp. 130-134.

(Continued)

*Primary Examiner* — Brian Yenke
(74) *Attorney, Agent, or Firm* — Steven Lee Fisher-Stawinski; Lance I. Hochhauser; Aaron N. Pontikos

(57) ABSTRACT

A computer-implemented method includes receiving a video frame. The computer-implemented method further includes dividing the video frame into two or more frame regions, each of the two or more frame regions corresponding to a selectively coolable region of a display. The computer-implemented method further includes identifying one or more frame characteristics for each of the two or more frame regions. The computer-implemented method further includes determining a cooling intensity to be applied to each selectively coolable region for displaying the video frame on the display based on the one or more frame characteristics. The computer-implemented method further includes applying the cooling intensity to each selectively coolable region at an effective time before displaying the video frame on the display. A corresponding computer system and computer program product are also disclosed.

6 Claims, 4 Drawing Sheets

(56) References Cited

U.S. PATENT DOCUMENTS

| | | | | |
|---|---|---|---|---|
| 6,067,126 | A * | 5/2000 | Alexander | G11B 27/034 348/722 |
| 6,188,439 | B1 * | 2/2001 | Kim | H04N 5/60 348/478 |
| 6,263,502 | B1 * | 7/2001 | Morrison | H04N 5/44 348/563 |
| 6,481,011 | B1 * | 11/2002 | Lemmons | H04N 5/44543 348/E5.105 |
| 6,501,654 | B2 * | 12/2002 | O'Connor | B81B 1/00 165/80.4 |
| 6,747,777 | B1 * | 6/2004 | Sikora | G09F 19/12 359/253 |
| 6,879,112 | B2 * | 4/2005 | Kubota | G09G 5/10 315/169.3 |
| 7,027,683 | B2 * | 4/2006 | O'Connor | G02B 1/06 385/16 |
| 7,205,962 | B2 * | 4/2007 | Cooke | G09F 13/24 101/483 |
| 7,245,316 | B2 * | 7/2007 | Grimes | H04N 3/20 348/173 |
| 7,440,006 | B2 * | 10/2008 | Lin | H04N 7/0122 348/173 |
| 7,453,469 | B2 * | 11/2008 | Stevenson | G09G 5/00 345/581 |
| 7,466,340 | B1 * | 12/2008 | Herz | G09G 3/20 348/173 |
| 7,619,609 | B2 * | 11/2009 | Fork | G09G 3/34 345/107 |
| 7,898,176 | B2 * | 3/2011 | Li | H05K 7/20981 313/46 |
| 8,050,449 | B2 | 11/2011 | Kim | |
| 8,058,802 | B2 * | 11/2011 | Li | H05K 7/20963 313/483 |
| 8,208,115 | B2 | 6/2012 | Dunn | |
| 8,228,596 | B2 * | 7/2012 | Sumiyoshi | G02B 26/004 359/296 |
| 8,695,355 | B2 * | 4/2014 | Maltezos | F25B 21/04 204/193 |
| 9,058,510 | B1 * | 6/2015 | Bold | G06T 11/00 |
| 9,207,484 | B2 * | 12/2015 | Hendren | G02F 1/133385 |
| 9,368,071 | B2 * | 6/2016 | Otte | G09G 3/3413 |
| 9,462,241 | B2 * | 10/2016 | Guthrie | H04N 9/3155 |
| 2007/0188425 | A1 * | 8/2007 | Saccomanno | G09G 3/3406 345/82 |
| 2008/0016532 | A1 * | 1/2008 | Wang | H04N 5/4401 725/45 |
| 2009/0278789 | A1 * | 11/2009 | Declercq | G09G 3/3413 345/102 |
| 2009/0322800 | A1 * | 12/2009 | Atkins | G09G 3/3413 345/690 |
| 2011/0243167 | A1 * | 10/2011 | Castillo | H01S 5/06804 372/34 |
| 2011/0316448 | A1 * | 12/2011 | Ashdown | G09G 3/3426 315/297 |
| 2013/0050590 | A1 * | 2/2013 | Nobutani | G01B 11/25 348/742 |
| 2013/0070208 | A1 * | 3/2013 | Nakanishi | G03B 21/16 353/31 |
| 2013/0317130 | A1 * | 11/2013 | Brassard | B29C 43/021 521/146 |
| 2014/0146033 | A1 * | 5/2014 | Koyama | G09G 3/3655 345/212 |
| 2014/0292835 | A1 * | 10/2014 | Matsushima | G09G 3/3648 345/690 |
| 2015/0281598 | A1 * | 10/2015 | Southerland | G01J 5/025 348/164 |
| 2015/0339967 | A1 * | 11/2015 | Shin | G06F 3/1446 345/690 |
| 2016/0021368 | A1 * | 1/2016 | Bly, Jr. | H04N 17/04 348/181 |
| 2016/0027365 | A1 * | 1/2016 | Kempf | G09G 3/2003 345/690 |
| 2016/0202761 | A1 * | 7/2016 | Bostick | G06F 3/016 345/174 |

OTHER PUBLICATIONS

Farnam, Dylan Sean, "Applications of Microfluidics: Electronics Cooling and Prevention of Infection", Dissertation, Submitted in partial fulfillment of the requirements for the degree of Doctor of Philosophy in Mechanical Engineering in the Graduate School of Binghamton University State University of New York 2010, UMI No. 3403376, UMI® Dissertation Publishing, Copyright 2010 by ProQuest LLC, 122 pages.

Leslie et al., "Frequency-specific flow control in microfluidic circuits with passive elastomeric features", Nature Physics, vol. 5, Mar. 2009, pp. 231-235, Published online: Feb. 1, 2009, doi:10.1038/nphys1196, © Macmillian Publishers Limited.

Mosadegh, Bobak, "Design and Fabrication of Microfluidic Integrated Circuits using Normally-Closed Elastomeric Valves", A dissertation submitted in partial fulfillment of the requirements for the degree of Doctor of Philosophy (Biomedical Engineering) In the University of Michigan 2010, © Bobak Mosadegh 2010, 177 pages.

Mosadegh et al., "Next-generation integrated microfluidic circuits", Lab on a Chip, QD53.L3, V. 11, No. 17, Sep. 2011, pp. 2813-2818, DOI: 10.1039/c11c20387h.

Whitaker, Tim, "Fact or Fiction—LEDs don't produce heat", LEDs Magazine, 9 pages, printed on Nov. 19, 2015, <http://www.ledsmagazine.com/articles/2005/05/fact-or-fiction-leds-don-t-produce-heat.html>.

Yazawa, K., "Thermal Management for LED Applications", 7 pages, Springer New York Heidelberg Dordrecht London, DOI 10.1007/978-1-4614-5091-7, Library of Congress Control No. 2013943845, © Springer Science + Business Media New York 2014.

"How to Choose the Right LED Lighting Product Color Temperature", SEESMART®, Earth Friendly LED Solutions, 3 pages, printed on Nov. 19, 2015, Copyright © 2010 Seesmart, Inc., <http://www.seesmartled.com/kb/choosing_color_temperature/>.

"Thermal management of electronic devices and systems", Wikipedia, the free encyclopedia, 11 pages, This page was last modified on Nov. 13, 2015, printed on Nov. 19, 2015, <https://en.wikipedia.org/wiki/Thermal_management_of_electronic_devices_and_systems>.

"Thermal management of high-power LEDs", Wikipedia, the free encyclopedia, 5 pages, This page was last modified on Sep. 22, 2015, printed on Dec. 9, 2015, <https://en.wikipedia.org/wiki/Thermal_management_of_high-power_LEDs>.

"What is Physics Good for?", Physics 251, 3 pages, printed on Nov. 19, 2015, This site is made possible by funding from the National Science Foundation (DUE-9981111), © 2001 A. Gavrin and G. Novak, all rights reserved, <http://webphysics.iupui.edu/webscience/physics_archive/colorandtemperature.html>.

* cited by examiner

THERMAL MANAGEMENT OF DISPLAY SCREENS

BACKGROUND

The present invention relates generally to thermal management of electronic devices and in particular to thermal management of display screens.

In recent years, a drastic increase in the number of LED-LCD displays has corresponded to a proliferation in the number of LED-LCD televisions in use. Although LED-LCD displays offer superior great picture, slim design, and increased functionality, managing the thermal impact of waste heat in large-screen displays remains a challenge for engineers and designers. A typical light emitting diode ("LED") may emit about 30% of its energy as usable visible light and about 70% as waste heat.

SUMMARY

A computer-implemented method includes receiving a video frame. The computer-implemented method further includes dividing the video frame into two or more frame regions, each of the two or more frame regions corresponding to a selectively coolable region of a display. The computer-implemented method further includes identifying one or more frame characteristics for each of the two or more frame regions. The computer-implemented method further includes determining a cooling intensity to be applied to each selectively coolable region for displaying the video frame on the display based on the one or more frame characteristics. The computer-implemented method further includes applying the cooling intensity to each selectively coolable region at an effective time before displaying the video frame on the display. A corresponding computer system and computer program product are also disclosed.

DETAILED DESCRIPTION

The challenge of using LEDs for display applications lies in the thermal drift of the diode characteristic with respect to the color spectrum. To attain high-quality color, white-appearing light is often emulated by combining narrow emissions from three or more colored LEDs. For example, red (GaAsP), green (GaP), and blue (InGaN) may be combined together to generate a spectrum that appears white to human eyes. Since a single wavelength originates from the band gap of the active layer in an LED, the intensities of the collocated and/or adjacent red, green, and blue LEDs may vary significantly due to the differences in the materials. Recently, white-appearing light may also be attained by coating LEDs of one color (e.g., blue LEDs) with phosphors that fluoresce in a different color to form white-appearing light (i.e., phosphor-based or phosphor-converted white LEDs (pcLEDs). However, as a result of the differences in intensities, the heat generated at each junction of an LED, and thus their corresponding junction temperature, is different.

For an LED-LCD television, the LED package (e.g., chip, wire-bonds, encapsulation, lens, lead-frame over-mold, and submount material), and LED junction (i.e., the boundary or interface between two types of semiconductor material) have reliability and performance concerns with respect to temperature. The inventors have observed and/or recognized that increasing junction temperature may lower the overall efficiency of the device, lower the forward voltage, cause the emission of visible light to shift to longer wavelengths, and reduce the device lifetime and reliability. The inventors have further observed and/or recognized that the reduction in efficiency and shift in wavelength will also cause the color temperature to change, especially in blue-based white LED devices, and that a rise in the phosphor's temperature will reduce lumen output (i.e., the amount of visible light emitted from a source per second). Thus, the quality and longevity of LED-LCD displays depend highly on proper thermal management.

The inventors have further observed and/or recognized that the nature of an LED-LCD televisions slim design makes it difficult to properly manage the thermal output of the LED's, and that this difficulty is evinced by the inadequacy of current thermal management practices, such as heat sinks, to maintain a low LED junction temperature However, if the LED junction temperature is not properly maintained, the LED's will run at higher temperatures, resulting in decreased color uniformity and brightness, lower efficiency, and a shorted lifespan. Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
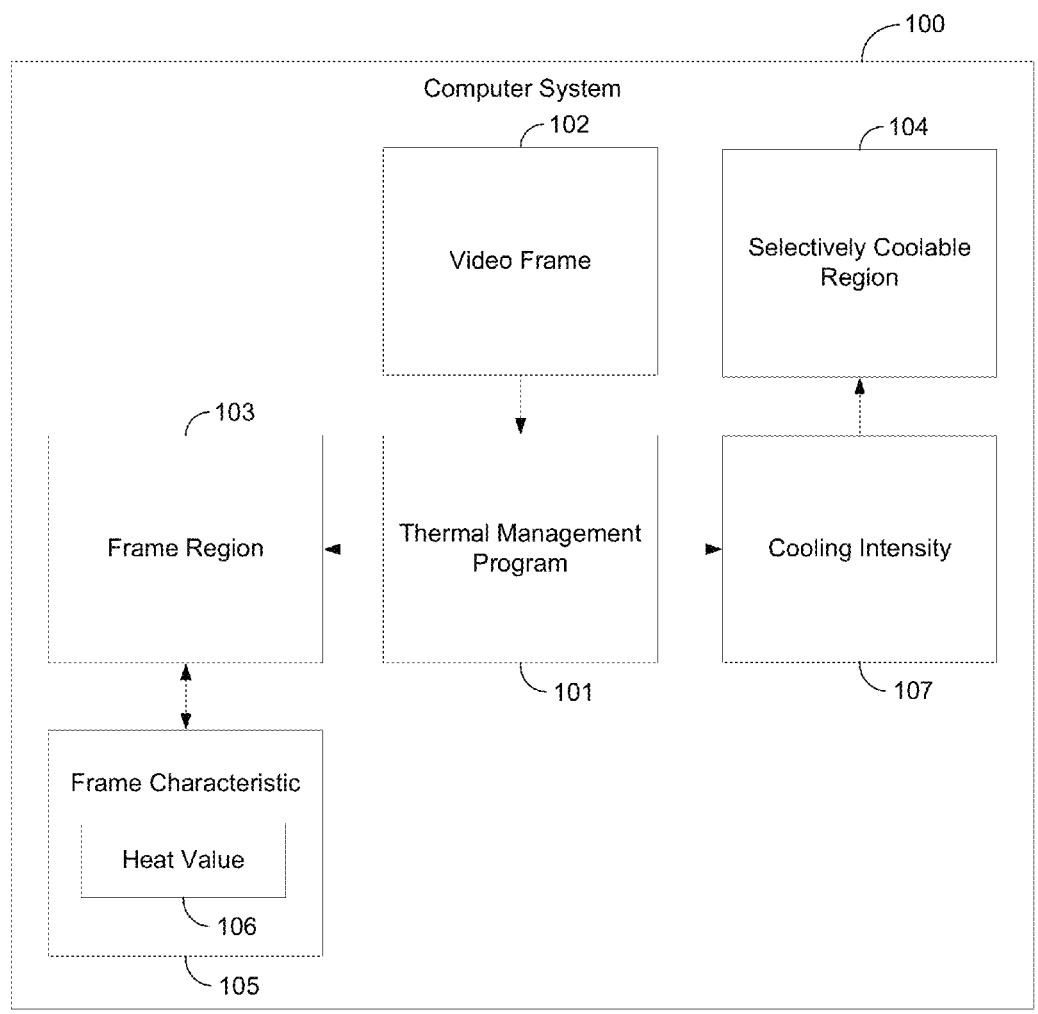
FIG. 1 is a block diagram of one embodiment of a computer system environment 100 suitable for operation in accordance with at least one embodiment of the invention.

The present invention will now be described in detail with references to the Figures. FIG. 1 is a block diagram of one embodiment of a computer system environment suitable for operation in accordance with at least one embodiment of the invention. It should be appreciated that in various embodiments of the invention, the thermal management program 101 may exist in a cloud-based, virtual, or distributed environment, or a remote environment on defined server hardware.

Within a computer system 100, a thermal management program 101 may receive a video frame 102. Generally, a video frame 102 may be understood as being one of many still images (e.g., in some formats, 24 frames may represent one second of film) which compose a complete moving picture. More specifically, a video frame 102 may be one of many still images that form a recording or broadcast (e.g., movie, television show, event, etc.) that can be watched on a display screen, such as a television or computer monitor. The thermal management program 101 may further divide the video frame 102 into two or more frame regions 103. Each of the two or more frame regions 103 may correspond to a selectively coolable region 104 of a display 201 (shown in FIG. 2). A selectively coolable region 104 of a display 201 may include one or more LEDs 202 (shown in FIG. 2).

Figure 2:
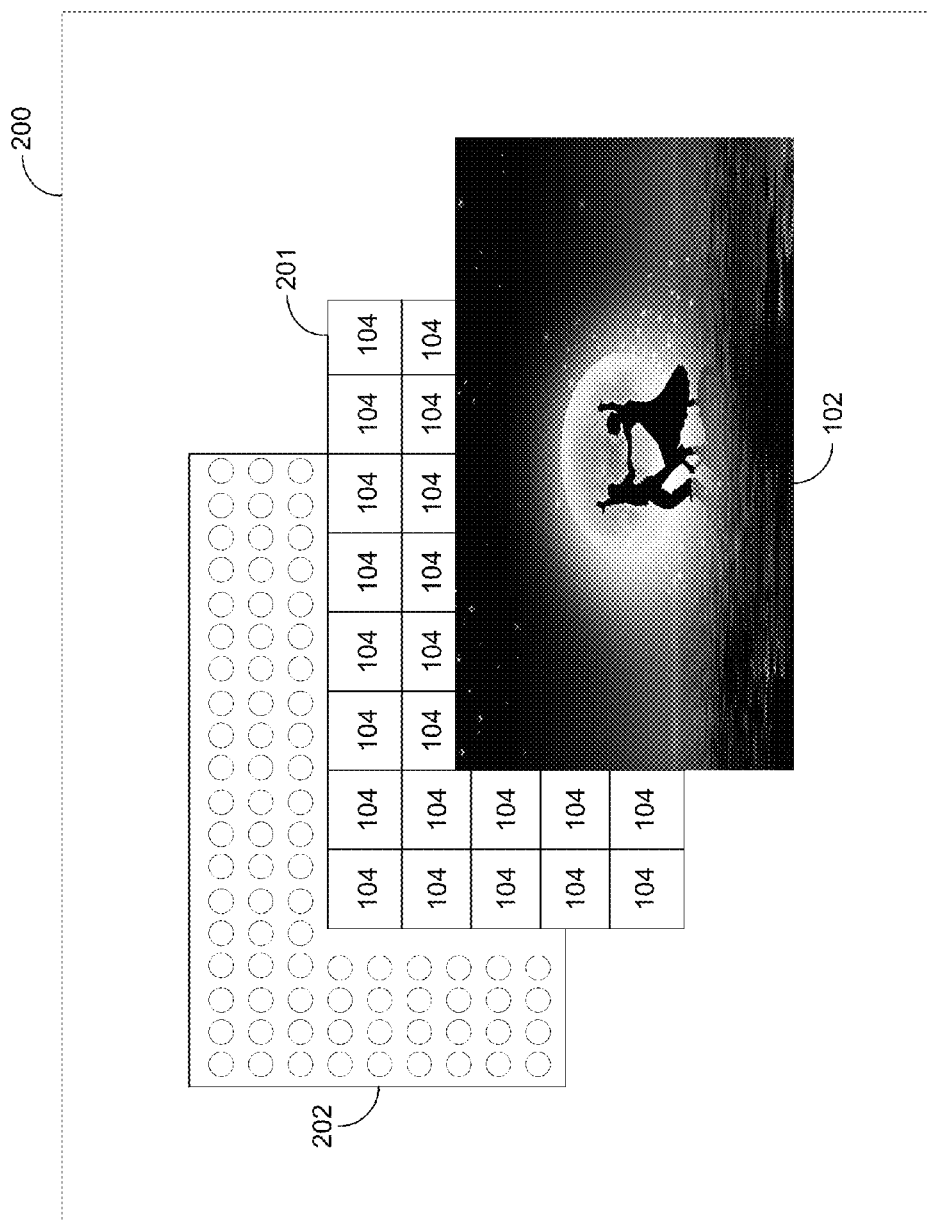
FIG. 2 is a diagram depicting an exemplary embodiment of an LED-LCD display environment 200 suitable for operation in accordance with at least one embodiment of the invention.

FIG. 2 is a block diagram depicting an exemplary embodiment of an LED-LCD display environment suitable for operation in accordance with at least one embodiment of the invention. Within an LED-LCD display environment 200, an array of LED's 202 are depicted. In some embodiments of the invention, the LEDs 202 may include an array of red, green and blue LEDs. In other embodiments of the invention, the LEDs 202 may include an array of white-light producing LEDs. Furthermore, in various embodiments of the invention, the LEDs 201 may be arranged in several different formats (e.g., edge-lit LEDs, back-lit LEDs, dynamic back-lit LEDS, etc.). In front of the array of LED's 201, a display 201 can be seen (e.g., an LCD). The display 201 may further include one or more selectively coolable regions 104. Each selectively coolable region 104 of the display 201 may be illuminated by one or more LED's 202 positioned behind the selectively coolable region 104 of the display 201 in accordance with the color and brightness required to display the video frame 102.

Returning back to FIG. 1, the thermal management program 101 may further identify one or more frame characteristics 105 for each of the one or more frame regions 103. The one or more frame characteristics 105 may include "color of pixels" and "intensity of pixels." Each of the one or more frame regions 103 may correspond to a selectively coolable region 104 of the display 201. Each selectively coolable region 104 of the display 201 may include one or more LEDs 202. In an LED-LCD display, the picture may comprise a multitude of red, blue and green pixels that are illuminated by white-appearing light generated from the LED's 202. Depending on the intensity of light required for displaying each of the two or more frame regions 103 for a series of video frames 102, the temperature of the LEDs 202 may vary with respect to each selectively coolable region 104 of the display 201. As such, the thermal management program 101 may assign a heat value 106 to the two or more frame regions 103 based on the one or more frame characteristics 105. The heat value 106 may be understood an estimation of the consumed electrical power of the LEDs 202 for each selectively coolable region 104 of the display 201.

The thermal management program 101 may further determine a cooling intensity 107 to be applied to each selectively coolable region 104 for displaying the video frame 102 on the display 201. The cooling intensity 107 may be determined based on the one or more frame characteristics 105 for each frame region 103 of the video frame 102. The thermal management program 101 may further apply the cooling intensity 107 to each selectively coolable region 104 at an effective time before displaying the video frame 102 corresponding to the video frame on the display 201. An effective time may be understood as a period of time prior to displaying the video frame 102 on the display 201 whereat, if selective cooling is applied at that time, the selectively coolable region 104 will be effectively cooled at the time that the video frame 102 is displayed.

Figure 3:
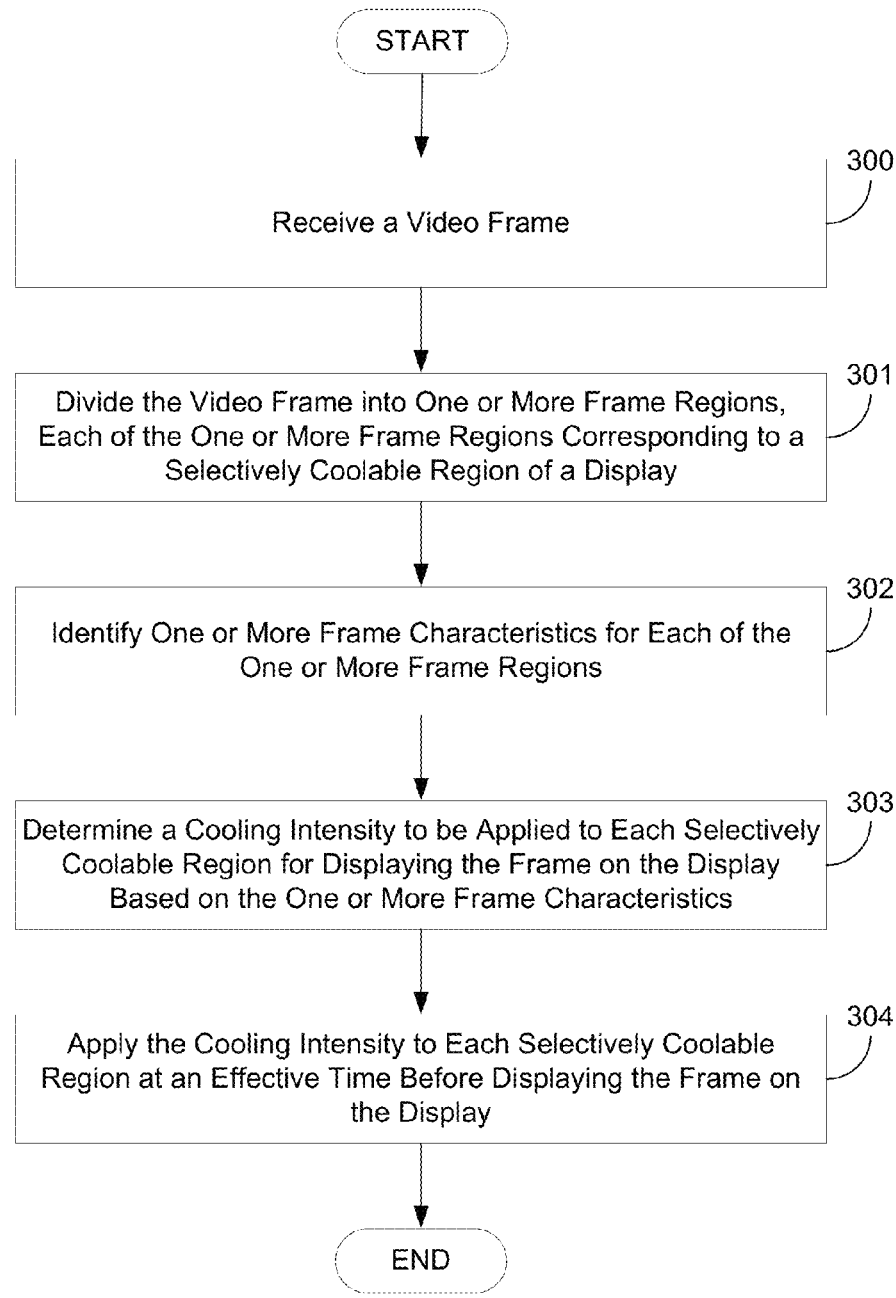
FIG. 3 is a flow chart diagram depicting the thermal management program in accordance with at least one embodiment of the invention.

FIG. 3 is a flow chart diagram depicting the thermal management program in accordance with at least one embodiment of the invention. According to the depicted embodiment, at step 300, the thermal management program 101 may receive a video frame 102. In some embodiments of the invention, the thermal management program 101 may receive video frames 102 from a recording, such as a VHS tape, DVD, Blu Ray® Disc, computer hard drive, etc. In other embodiments of the invention, the thermal management program 101 may receive video frames 102 from a real-time source, such as television broadcast, cable, satellite, streaming internet video, etc.

At step 301, the thermal management program 101 may divide each video frame 102 into two or more frame regions 103. The video frame 102 may be divided into two or more frame regions 103 by any generally known image location methods, including, but not limited to a pixel indices system or a spatial coordinate system. Here, each of the two or more frame regions 103 correspond to a selectively coolable region 104 of a display 201 (e.g., television, computer monitor, etc.) More specifically, each selectively coolable region 104 of the display 201 may include one or more LEDs 202. In some embodiments of the invention, the LEDs 202 may include an array of red, green and blue LEDs. In other embodiments of the invention, the LEDs 202 may include an array of white-light producing LEDs 202. Furthermore, in various embodiments of the invention, the LEDs 202 may be arranged in several different formats (e.g., edge-lit LEDs, back-lit LEDs, dynamic back-lit LEDS, etc.).

At step 302, the thermal management program 101 may identify one or more frame characteristics 105 for each frame region 103 of the video frame 102. The frame characteristics 105 may include "color of pixels" and "intensity of pixels." However, the thermal management program 101 may identify any other number of frame characteristics 105 that may compose the frame region 103. The thermal management program 101 may identify the color of the pixels and the intensity of the pixels that compose the frame region 103 by any generally known image segmentation methods, including, but not limited to clustering methods, compression-based methods, edge detection methods, etc. The thermal management program 101 may identify the color of the pixels and intensity of the pixels for each frame region 103 for a given quantity of successive video frames 102 (e.g., 50 frames, 100 frames, 1,000 frames, etc.) prior to displaying the video frames 102 on the display 201.

For example, the thermal management program 101 may receive a given quantity of successive video frames 102 for a nighttime scene of a video to be displayed by a back-lit LED-LCD television. In a back-lit LED-LCD television, LED 202 arrays are located behind the display 201. The thermal management program 101 may divide each successive video frame 102 into two or more frame regions 103: e.g., region A ("A"), region B ("B"), region C ("C"), and region D ("D"). Each frame region 103 of the video frame 102 may correspond to a selectively coolable region 104 of the television. Furthermore, each selectively coolable region 104 of the television may include one or more LED 202 arrays located behind the display screen.

For each video frame 102, the thermal management program 101 may identify one or more frame characteristics 105 (e.g., color of pixels and intensity of pixels) that compose frame regions 103 A, B, C, and D. In the case of the nighttime scene, an image of a moon may be displayed in frame region B for 2,160 consecutive video frames 102 (i.e., 90 seconds). For frame region B, the thermal management program 101 may identify white and yellow pixels with a "high" intensity level. Similarly, an image of a dark night sky with two individuals dancing may be displayed throughout frame regions A, C, and D for 2,160 consecutive frames (i.e., 90 seconds). For frame regions A, C, and D, the thermal management program 101 may identify black, dark blue, and dark brown pixels with a "low" intensity level.

Still referring to step 302, the thermal management program 101 may further assign each frame region 103 a heat value 106 based on the frame characteristics 105. More specifically, a heat value 106 is an estimation of the electrical input power of the LEDs 202 for each selectively coolable region 104 of the display 201. Whereas only a fraction of the input power to an LED 202 will be converted into light, the remaining majority of the input power will become heat. Thus, the higher the electrical input power to the LED 202, the higher the operating temperature of the LED 202, and the higher the heat value 106 assigned to the frame region 103.

For example, frame region "X" may be composed of "bright" colored pixels (e.g., white, yellow, light green, etc.) and a "high" intensity level. As such, the LEDs 202 located in the corresponding selectively coolable region 104 of the display 201 will require an increase in their electrical input power. Thus, a "high" heat value 106 may be assigned to frame region "X." Conversely, frame region "Y" may be composed of "dark colored pixels (black, dark blue, and brown, etc.) and a "low" intensity level. As such, the LEDs 202 located in the corresponding selectively coolable region 104 of the display 201 will require a decrease in their electrical input power. Thus, a "low" heat value 106 may be assigned to frame region "Y." Once a heat value 106 has been determined for two or more frame regions 103 for a given quantity of successive video frames 102, the thermal management program 101 may store the heat value 106 for each selectively coolable region 104 of a display 201 as video metadata.

In one embodiment of the invention, the thermal management program 101 may assign a heat value 106 for two or more frame regions 103 to be displayed on a dynamic back-lit LED-LCD television. In a back-lit LED-LCD television, the LEDs 202 are dimmed for dark regions (i.e., dark color pixels and "low" intensity level) of the video, and boosted (i.e., temporarily driven at higher electrical input power) for bright regions (i.e., bright color pixels and "high" intensity level") of the video. Previously, the thermal management program 101 identified white and yellow pixels with a "high" intensity level for frame region B. Thus, the thermal management program 101 may assign a "high" heat value 106 to frame region B for 2,160 consecutive video frames 102. Conversely, the thermal management program 101 identified black, dark blue, and dark brown pixels with a "low" intensity level for frame regions A, C, and D. Thus, the thermal management program 101 may assign a "low" heat value 106 to frame regions A, C, and D for the same 2,160 consecutive video frames 102.

At step 303, the thermal management program 101 may determine a cooling intensity 107 to be applied to each selectively coolable region 104 for displaying the video frame 102 on a display 201 based on the one or more frame characteristics 105. More specifically, the cooling intensity 107 may be determined according to the heat value 106 previously determined in step 302. The thermal management program 101 may cool each selectively coolable region 104 by any generally known cooling means, including, but not limited to microfluidic circuits. Here, microfluidic circuits may surround each LED junction. Depending on the heat value 106 assigned to each frame region 103, the thermal management program 101 may alter the volume and flow rate of a transparent coolant (e.g., air or liquid) for each corresponding selectively coolable region 104 of the display 201. In one embodiment of the invention, each selectively coolable region 104 of a display 201 may be cooled by an electrostatic fluid acceleration (EFA) system. In another embodiment of the invention, each selectively coolable region 104 of a display 201 may be cooled by a digital microfluidic system. In yet another embodiment of the invention, each selectively coolable region 104 of a display 201 may be cooled by micro electrical mechanical systems (MEMS). In a further embodiment of the invention, each selectively coolable region 104 of a display 201 may be cooled by an elastomer-membrane base microfluidic system.

At step 304, the thermal management program 101 may apply the cooling intensity 107 to each selectively coolable region 104 at an effective time before displaying the video frame 102 on the display 201. An effective time may be understood as the amount of time necessary to cool an LED junction and thereby prevent the LED junction from exceeding a temperature threshold level (e.g., 40 degrees Celsius, 50 degrees Celsius, etc.). Here, the thermal management program 101 may proactively arrange the amount and intensity of fluid for each corresponding coolable region 104 of the display 201 for the "currently displayed" video. The thermal management program 101 may further proactively arrange the amount and intensity of fluid for each corresponding coolable region 104 of the display 201 for video that will be displayed in the "near future" (e.g., 5 seconds, 10 seconds, 30 seconds, etc.). As each portion of video that will be displayed in the "near future" becomes the "currently displayed" video with the passage of time, the thermal management program 101 may continue to repeat step 304 for the entirety of the video.

Figure 4:
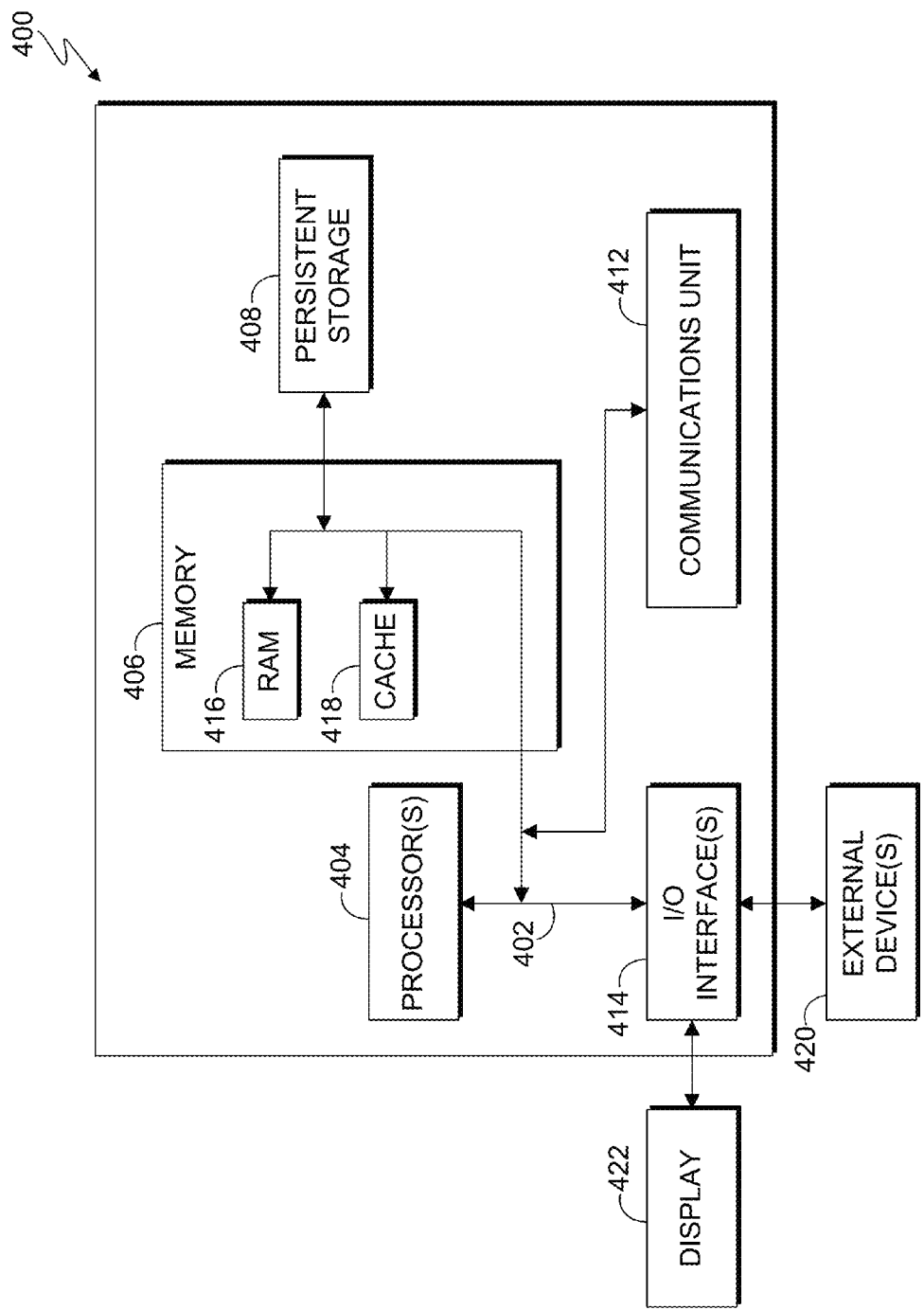
FIG. 4 is a block diagram depicting components of a computer 300 suitable for executing the thermal management program 101.

FIG. 4 is a block diagram depicting components of a computer 400 suitable for executing the thermal management program 101. FIG. 4 displays the computer 400, the one or more processor(s) 404 (including one or more computer processors), the communications fabric 402, the memory 406, the RAM 416, the cache 418, the persistent storage 408, the communications unit 412, the I/O interfaces 414, the display 422, and the external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over a communications fabric 402, which provides communications between the computer processor(s) 404, memory 406, persistent storage 408, communications unit 412, and input/output (I/O) interface(s) 414. The communications fabric 402 may be implemented with any architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random access memory (RAM) 416 and a cache 418. In general, the memory 406 may comprise any suitable volatile or non-volatile one or more computer readable storage media.

Program instructions for the thermal management program 101 may be stored in the persistent storage 408, or more generally, any computer readable storage media, for execution by one or more of the respective computer processors 404 via one or more memories of the memory 406. The persistent storage 408 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 406 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   dividing a video frame into two or more frame regions, wherein:
     each of said two or more frame regions correspond to a selectively coolable region of a display;
     said selectively coolable region of said display includes a plurality of light emitting diodes; and
     a plurality of microfluidic circuits surround said plurality of light emitting diodes;
   determining, for each of said two or more frame regions, a heat value based, at least in part, on said one or more frame characteristics for each of said two or more frame regions, wherein said heat value is an estimation of an electrical input power of said plurality of light emitting diodes included in said selectively coolable region of said display at a time said video frame is displayed;
   determining a cooling intensity to be applied to each said selectively coolable region of said display based, at least in part, on said heat value; and
   proactively altering a volume and a flow rate of a coolant through said plurality of microfluidic circuits included in each said selectively coolable region based, at least in part, on said cooling intensity for each said selectively coolable region at an effective time prior to an appearance of said video frame on said display.

2. The computer-implemented method of claim 1, wherein said heat value for each said selectively coolable region on said display is stored as video metadata.

3. A computer program product, the computer program product comprising one or more computer readable storage devices, wherein the one or more computer readable storage devices are not transitory signals per se, and program instructions stored on said one or more computer readable storage devices, said program instructions comprising instructions to:
   divide, by one or more processors, a video frame into two or more frame regions, wherein:
     each of said two or more frame regions correspond to a selectively coolable region of a display;
     said selectively coolable region of said display includes a plurality of light emitting diodes; and
     a plurality of microfluidic circuits surround said plurality of light emitting diodes;
   determine, by one or more processors, for each of said two or more frame regions, a heat value based, at least in part, on said one or more frame characteristics for each of said two or more frame regions, wherein said heat value is an estimation of an electrical input power of said plurality of light emitting diodes included in said selectively coolable region of said display at a time said video frame is displayed;
   determine, by one or more processors, a cooling intensity to be applied to each said selectively coolable region of said display based, at least in part, on said heat value; and
   proactively alter, by one or more processors, a volume and a flow rate of a coolant through said plurality of microfluidic circuits included in each said selectively coolable region based, at least in part, on said cooling intensity for each said selectively coolable region at an effective time prior to an appearance of said video frame on said display.

4. The computer program product of claim 3, wherein said heat value for each said selectively coolable region on said display is stored as video metadata.

5. A computer system, the computer system comprising:
   one or more computer processors;
   one or more computer readable storage devices, wherein the one or more computer readable storage devices are not transitory signals per se;
   computer program instructions;
   said computer program instructions being stored on said one or more computer readable storage devices;
   said computer program instructions comprising instructions to:
   divide, by one or more processors, a video frame into two or more frame regions, wherein:
     each of said two or more frame regions correspond to a selectively coolable region of a display;
     said selectively coolable region of said display includes a plurality of light emitting diodes; and
     a plurality of microfluidic circuits surround said plurality of light emitting diodes;
   determine, by one or more processors, for each of said two or more frame regions, a heat value based, at least in part, on said one or more frame characteristics for each of said two or more frame regions, wherein said heat value is an estimation of an electrical input power of said plurality of light emitting diodes included in said selectively coolable region of said display at a time said video frame is displayed;
   determine, by one or more processors, a cooling intensity to be applied to each said selectively coolable region of said display based, at least in part, on said heat value; and proactively alter, by one or more processors, a volume and a flow rate of a coolant through said plurality of microfluidic circuits included in each said selectively coolable region based, at least in part, on said cooling intensity for each said selectively coolable region at an effective time prior to an appearance of said video frame on said display.

6. The computer program product of claim 5, wherein said heat value for each said selectively coolable region on said display is stored as video metadata.

* * * * *